(12) United States Patent
Itozawa et al.

(10) Patent No.: US 11,322,272 B2
(45) Date of Patent: May 3, 2022

(54) COILED CORD AND DISPLACEMENT APPARATUS

(71) Applicant: TOYOTA JIDOSHA KABUSHIKI KAISHA, Toyota (JP)

(72) Inventors: Yuta Itozawa, Nagoya (JP); Hirotaka Komura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/996,998

(22) Filed: Aug. 19, 2020

(65) Prior Publication Data
US 2021/0090758 A1 Mar. 25, 2021

(30) Foreign Application Priority Data
Sep. 20, 2019 (JP) .............................. JP2019-171385

(51) Int. Cl.
*H01B 7/00* (2006.01)
*H01B 7/06* (2006.01)

(52) U.S. Cl.
CPC ...................................... *H01B 7/06* (2013.01)

(58) Field of Classification Search
CPC ........................................................ H01B 7/06
See application file for complete search history.

(56) References Cited

U.S. PATENT DOCUMENTS

| | | | |
|---|---|---|---|
| 1,989,066 A | 1/1935 | Shaw | |
| 2,764,625 A * | 9/1956 | Ingmanson | H01B 7/06 174/69 |
| 3,246,075 A * | 4/1966 | Dansard | H01B 7/06 174/69 |
| 3,318,994 A * | 5/1967 | Perrone | H01B 7/06 174/69 |
| 3,334,176 A | 8/1967 | Liszczak | |
| 3,488,431 A * | 1/1970 | Nixon | H01B 7/0009 174/70 R |
| 8,563,860 B1 | 10/2013 | Ramos, Jr. | |

(Continued)

FOREIGN PATENT DOCUMENTS

| | | |
|---|---|---|
| DE | 19754545 A1 | 5/1998 |
| EP | 1109176 A1 | 6/2001 |

(Continued)

OTHER PUBLICATIONS

JPH06160645 A1 English Translation Application date of Nov. 19, 1992 (Year: 1992).*

*Primary Examiner* — Pete T Lee
(74) *Attorney, Agent, or Firm* — Oliff PLC

(57) ABSTRACT

The present disclosure provides a coiled cord capable of increasing the length of a cable while preventing a winding diameter of the coiled cord in a plane orthogonal to the direction in which the coiled cord is extended and contracted in a natural state from increasing. A first exemplary aspect is a coiled cord around which a cable is wound, the cable being capable of being freely extended and contracted, the coiled cord including: a first layer in which the cable is wound from an inner side of the coiled cord to an outer side thereof in a radial direction, and a second layer in which the cable is wound from the outer side of the coiled cord to the inner side thereof in the radial direction, in which the first and the second layers are continuously connected to each other.

4 Claims, 8 Drawing Sheets

(56) References Cited

U.S. PATENT DOCUMENTS

| | | | | |
|---|---|---|---|---|
| 2006/0237701 | A1* | 10/2006 | Ogata | H02G 7/06 |
| | | | | 254/134.3 CL |
| 2016/0129863 | A1 | 5/2016 | Iwata | |
| 2017/0287597 | A1* | 10/2017 | Wagner | H01B 13/14 |
| 2018/0208444 | A1 | 7/2018 | Kultanen et al. | |

FOREIGN PATENT DOCUMENTS

| | | |
|---|---|---|
| JP | S55-69819 U | 5/1980 |
| JP | 2001-351442 A | 12/2001 |

* cited by examiner

COILED CORD AND DISPLACEMENT APPARATUS

CROSS REFERENCE TO RELATED APPLICATIONS

This application is based upon and claims the benefit of priority from Japanese patent application No. 2019-171385, filed on Sep. 20, 2019, the disclosure of which is incorporated herein in its entirety by reference.

BACKGROUND

The present disclosure relates to a coiled cord and a displacement apparatus.

A common coiled cord has a structure in which cables are wound, are extended when they are stretched, and are contracted in a natural state in which they are not stretched. For example, the coiled cord disclosed in Japanese Unexamined Patent Application Publication No. 2001-351442 has a structure in which cables are spirally wound in the same plane in a natural state. By this structure, it is possible to house the coiled cord disclosed in Japanese Unexamined Patent Application Publication No. 2001-351442 in a flat housing space having a thickness of about a line width of the cable in a natural state.

SUMMARY

The applicant has however found the following problem. The coiled cord disclosed in Japanese Unexamined Patent Application Publication No. 2001-351442 has a structure in which cables are spirally wound in the same plane in a natural state, and this structure leads to a problem that a winding diameter of the coiled cord (i.e., a length of the coiled cord in the radial direction) in the plane orthogonal to the direction in which the coiled cord is extended and contracted becomes large.

The present disclosure has been made in view of the above-described problem and provides a coiled cord and a displacement apparatus that enable an increase in the length of a cable while preventing a winding diameter of the coiled cord in a plane orthogonal to the direction in which the coiled cord is extended and contracted in a natural state from increasing.

A first exemplary aspect is a coiled cord around which a cable is wound, the cable being capable of being freely extended and contracted, the coiled cord including:

a first layer in which the cable is wound from an inner side of the coiled cord to an outer side thereof in a radial direction, and a second layer in which the cable is wound from the outer side of the coiled cord to the inner side thereof in the radial direction, in which the first and the second layers are continuously connected to each other.

In such a coiled cord, as cables are stacked in a plurality of layers in a nesting structure, the length of each of the cables can be increased as compared to the cables of the coiled cord disclosed in Japanese Unexamined Patent Application Publication No. 2001-351442 while preventing a winding diameter of the coiled cord in a plane orthogonal to the direction in which the coiled cord is extended and contracted in a natural state from increasing.

In the coiled cord described above, when a direction in which the coiled cord is extended and contracted is one axial direction, a plurality of the cables may be stacked and integrated in the direction in which the coiled cord is extended and contracted.

By doing so, the cables tend to bundle together to maintain the posture of the coiled cord in the direction in which the coiled cord is extended and contracted, and thus it is possible to prevent the posture of the coiled cord in a natural state from collapsing.

In the coiled cord described above, a direction in which the cable of the first layer is wound from the inner side of the coiled cord to the outer side thereof in the radial direction may be the same as a direction in which the cable of the second layer is wound from the outer side of the coiled cord to the inner side thereof in the radial direction.

In the coiled cord described above, a direction in which the cable of the first layer is wound from the inner side of the coiled cord to the outer side thereof in the radial direction may be different from a direction in which the cable of the second layer is wound from the outer side of the coiled cord to the inner side thereof in the radial direction.

Another exemplary aspect is a displacement apparatus including a part to be displaced and configured so that the part to be displaced is displaced with respect to a base part, in which the displacement apparatus further includes the above-described coiled cord that is extended and contracted in accordance with a displacement of the part to be displaced.

Such a displacement apparatus can increase the length of the cable while preventing the winding diameter of the coiled cord in a plane orthogonal to the direction in which the coiled cord is extended and contracted and the height of the coiled cord in the direction in which the coiled cord is extended and contracted from increasing. Further, for example, in a case of a structure in which the coiled cord is housed inside the displacement apparatus, a large amount of a displacement can be secured while reducing the housing space for the coiled cord.

In the displacement apparatus described above, the displacement apparatus may further include a restricting member that restricts an extension of the coiled cord.

By doing so, it is possible to reduce a local load on the cable and prevent the coiled cord from being damaged.

In the displacement apparatus described above, the restricting member may connect a first part of the cable in a predetermined layer of the coiled cord, the first part being located at the inner side of the coiled cord in the radial direction, to a second part of the cable in a layer different from the predetermined layer of the coiled cord, the second part being located at the inner side of the coiled cord in the radial direction.

In the displacement apparatus described above, when the coiled cord is located so that a side of the coiled cord in a gravity direction is set to be a lower side thereof, the restricting member may be located in an upper part of the coiled cord.

By doing so, it is possible to reduce a local load on the cable and prevent the coiled cord from being damaged.

In the displacement apparatus described above, a length of the restricting member may be shorter as the restricting member is located at a position in which a frequency of an extension and a contraction of the coiled cord is higher.

By this structure, it is possible to distribute a load on the coiled cord. As a result, it is possible to reduce a local load on the cable and prevent the coiled cord from being damaged.

According to the present disclosure, it is possible to provide a coiled cord and a displacement apparatus that enable an increase in the length of a cable while preventing a winding diameter of the coiled cord in a plane orthogonal to the direction in which the coiled cord is extended and contracted in a natural state from increasing.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the embodiments shown below. Further, for the clarification of the explanation, the following descriptions and the drawings are simplified as appropriate.

First Embodiment

Figure 1:
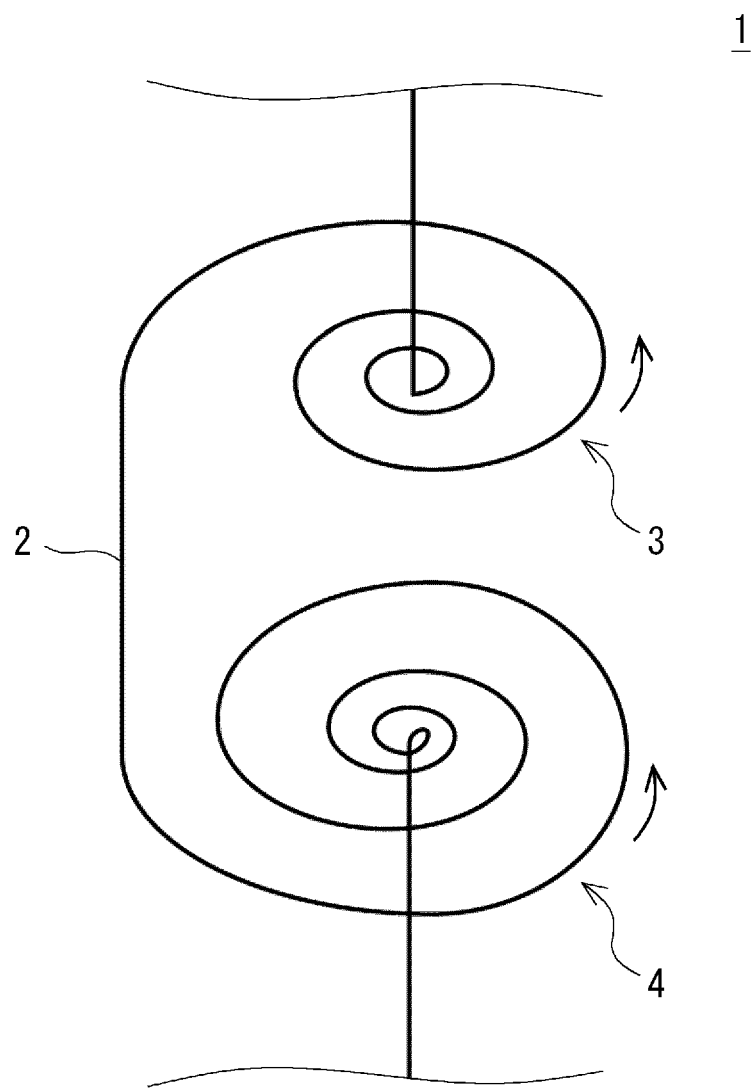
FIG. 1 is an enlarged perspective view of a part of a coiled cord according to a first embodiment.
Figure 2:
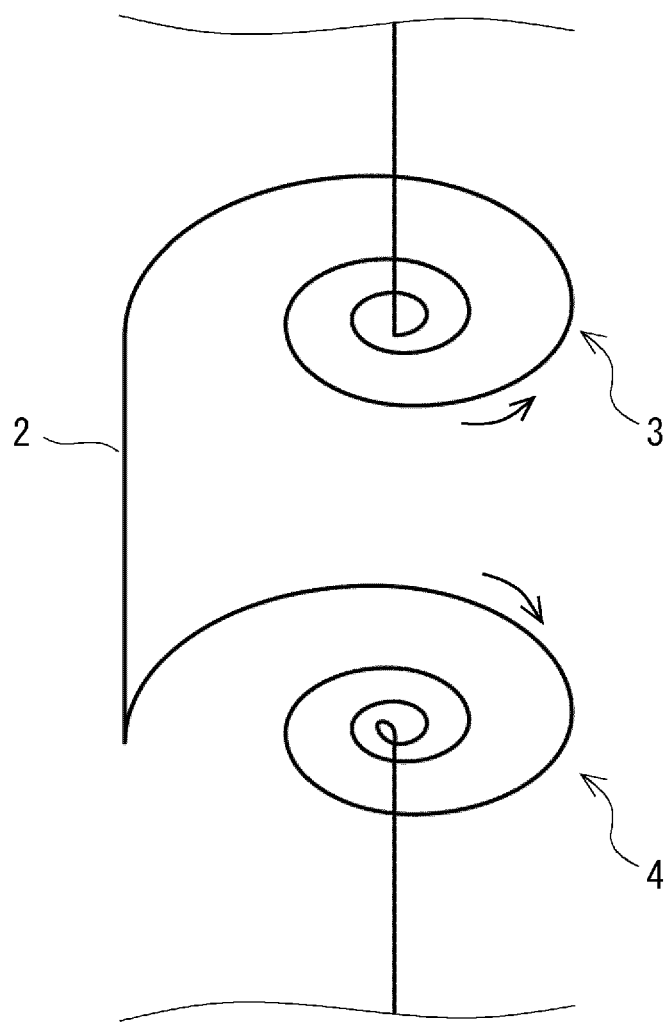
FIG. 2 is an enlarged perspective view of a part of another coiled cord according to the first embodiment.
Figure 3:
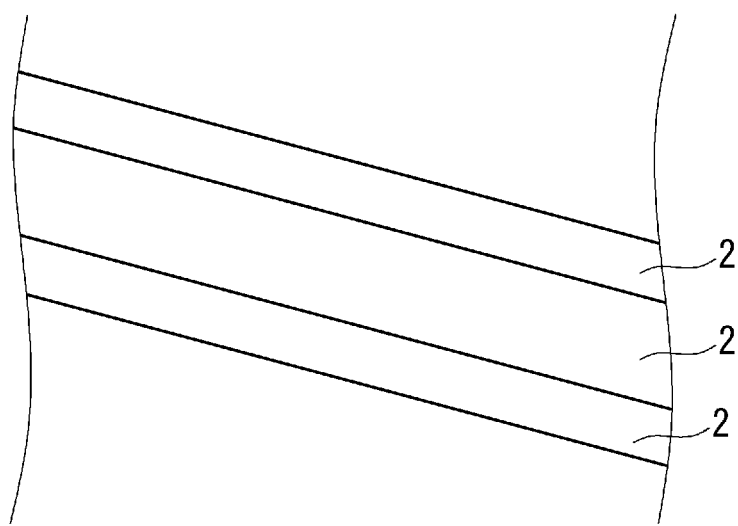
FIG. 3 is a diagram showing stacked cables of the coiled cord according to the first embodiment.

First, the structure of a coiled cord according to this embodiment is described. FIG. 1 is an enlarged perspective view of a part of the coiled cord according to this embodiment. FIG. 2 is an enlarged perspective view of a part of another coiled cord according to this embodiment. FIG. 3 is a diagram showing stacked cables of the coiled cord according to this embodiment. Note that in FIGS. 1 to 3, the coiled cord is simplified. In the following description, it is assumed that the coiled cord is extended and contracted in one axial direction, in order to clarify the description.

As shown in FIG. 1, in a coiled cord 1, a cable 2 is wound so that it can be extended and contracted, and in a natural state in which it is contracted, a plurality of layers in which the cable 2 is wound are stacked so as to be continuously formed in the direction in which the coiled cord 1 is extended and contracted. Specifically, in the coiled cord 1, a first layer 3 in which the cable 2 is wound from the inner side of the coiled cord 1 to the outer side thereof in the radial direction and a second layer 4 in which the cable 2 is wound from the outer side of the coiled cord 1 to the inner side thereof in the radial direction are formed so that they are continuously connected to each other. Further, the first layer 3 and the second layer 4 are alternately located in the direction in which the coiled cord 1 is extended and contracted.

For example, if the coiled cord 1 is located so that the side of the coiled cord 1 in the gravity direction is set to be the lower side thereof and the coiled cord 1 is extended and contracted in the vertical direction, the cable 2 of the first layer 3 is wound counterclockwise from the inner side of the coiled cord 1 to the outer side thereof in the radial direction when the coiled cord 1 is viewed from the upper side thereof. On the other hand, the cable 2 of the second layer 4 is wound counterclockwise from the outer side of the coiled cord 1 to the inner side thereof in the radial direction. Further, an end of the cable 2 of the first layer 3 located on the inner side of the coiled cord 1 in the radial direction is formed continuously with an end of the cable 2 of the second layer 4, which is located on the upper side of the first layer 3, on the inner side of the coiled cord 1 in the radial direction, and an end of the cable 2 of the first layer 3 on the outer side of the coiled cord 1 in the radial direction is continuously formed with an end of the cable 2 of the second layer 4, which is located on the lower side of the first layer 3, on the outer side of the coiled cord 1 in the radial direction.

By repeatedly forming the above first and second layers 3 and 4, the cable 2 of the coiled cord 1 has a so-called nesting structure in which the cable 2 located on the inner side of the coiled cord 1 in the radial direction is housed in the inner side of the cable 2 located on the outer side of the coiled cord 1 in the radial direction in a natural state in which the coiled cord 1 is contracted.

Note that the direction in which the cable 2 is wound is not limited to the counterclockwise direction as described above and may instead be the clockwise direction. Further, as shown in FIG. 2, the direction in which the cable 2 of the first layer 3 is wound from the inner side of the coiled cord 1 to the outer side thereof in the radial direction may be different from the direction in which the cable 2 of the second layer 4 is wound from the outer side of the coiled cord 1 to the inner side thereof in the radial direction. Thus, when the coiled cord 1 in which the direction in which the cable 2 of the first layer 3 is wound differs from the direction in which the cable 2 of the second layer 4 is wound is used as a power wire, it is possible to prevent generation of a magnetic field.

The cable 2 is a wire rod. The cable 2 is, for example, a signal wire or a power wire, and includes a wire rod such as a conductive member covered with an insulating resin. It should be noted that as shown in FIG. 3, a plurality of cables 2 may be stacked and integrated in the direction in which the coiled cord 1 is extended and contracted, and detailed functions of which will be described later. For example, in FIG. 3, the three cables 2 are stacked and integrated in the direction in which the coiled cord 1 is extended and contracted, and each of the cables 2 is formed as a signal wire, a power wire, and a Local Area Network (LAN) wire. However, the function of the cable 2 is not limited to these. Further, the number of cables 2 to be stacked may be any number. Note that the cross-sectional shape of the cable 2 may be any of a circular shape, an elliptical shape, and a polygonal shape.

Figure 4:
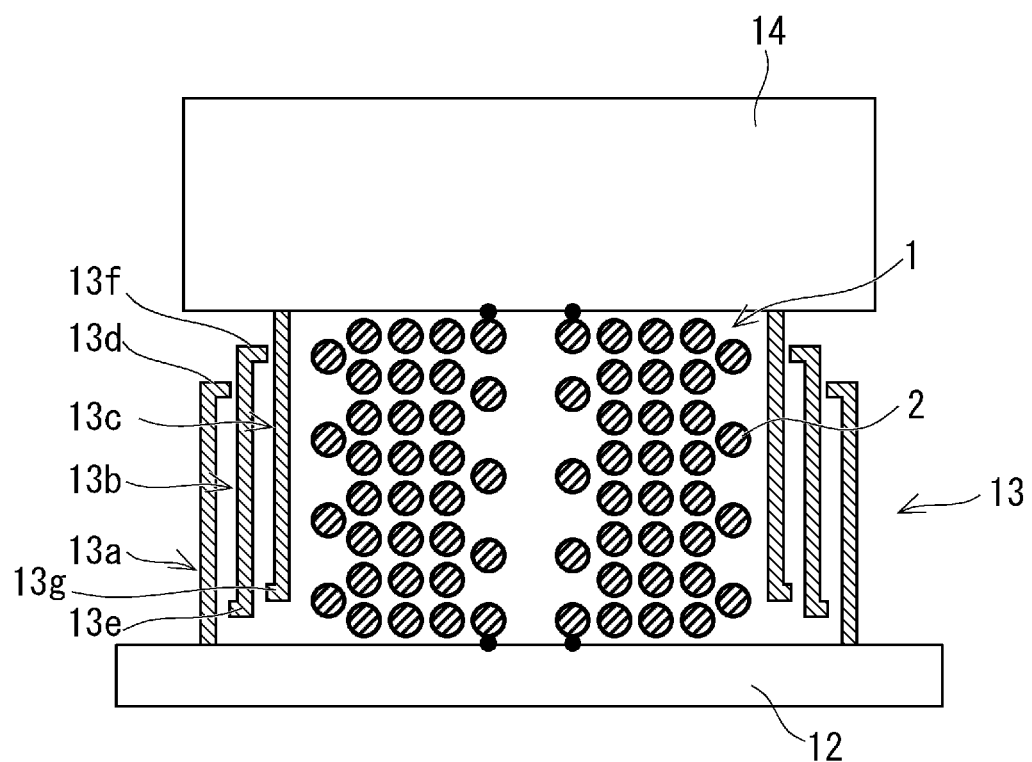
FIG. 4 is a diagram showing a state in which a displacement apparatus to which the coiled cord according to the first embodiment is applied is contracted.

Next, the structure of a displacement apparatus to which the coiled cord 1 according to this embodiment is applied is described. FIG. 4 is a diagram showing a state in which the displacement apparatus to which the coiled cord according to this embodiment is applied is contracted. Note that a part of FIG. 4 is an end view. A displacement apparatus 11 includes, for example, a base part 12, an extending and contracting mechanism 13, a part 14 to be displaced, and the coiled cord 1, and is a neck joint part of a robot.

The base part 12 is, for example, a body part of a robot. The extending and contracting mechanism 13 constitutes, for example, a neck part of a robot, so that the neck part can be extended and contracted. Specifically, the extending and contracting mechanism 13 includes, for example, a first cylindrical rod 13a, a second cylindrical rod 13b inserted into the first cylindrical rod 13a, and a third cylindrical rod 13c inserted into the second cylindrical rod 13b.

The first cylindrical rod 13a basically has, for example, a cylindrical shape, and one end of the first cylindrical rod 13a is fixed to the base part 12. Further, a protruding part 13d protruding inward of the first cylindrical rod 13a is provided at the other end of the first cylindrical rod 13a.

The second cylindrical rod 13b basically has, for example, a cylindrical shape, and the outside diameter of the second cylindrical rod 13b is smaller than the inside diameter of the first cylindrical rod 13a. Further, a first protruding part 13e protruding outward of the second cylindrical rod 13b is provided at one end of the second cylindrical rod 13b, and a second protruding part 13f protruding inward of the second cylindrical rod 13b is provided at the other end of the second cylindrical rod 13b.

The third cylindrical rod 13c basically has, for example, a cylindrical shape, and the outside diameter of the third cylindrical rod 13c is smaller than the inside diameter of the second cylindrical rod 13b. Further, a protruding part 13g protruding outward of the third cylindrical rod 13c is provided at the one end of the third cylindrical rod 13c.

Each of the above-described first cylindrical rod 13a, second cylindrical rod 13b, and third cylindrical rod 13c is extended and contracted like a so-called extendable antenna by an actuator (not shown). However, the extending and contracting mechanism 13 may include a member that can be extended and contracted such as a bellows member instead of a plurality of cylindrical rods. Further, the cross-sectional shape of each of the cylindrical rods 13a, 13b, and 13c is not limited to a circular shape, and may instead be an elliptical shape or a polygonal shape.

The part 14 to be displaced is, for example, a head part of a robot, and is fixed to the other end of the third cylindrical rod 13c. The coiled cord 1 is housed inside the first cylindrical rod 13a, the second cylindrical rod 13b, and the third cylindrical rod 13c of the extending and contracting mechanism 13. Further, one end of the coiled cord 1 is connected to the base part 12, and the other end thereof is connected to the part 14 to be displaced.

Next, a description is given of a state in which the displacement apparatus to which the coiled cord 1 according to this embodiment is applied is contracted. As shown in FIG. 4, when the displacement apparatus 11 is contracted, the second cylindrical rod 13b is substantially housed inside the first cylindrical rod 13a, and the third cylindrical rod 13c is substantially housed inside the second cylindrical rod 13b.

At this time, the coiled cord 1 is in a natural state in which the first and the second layers 3 and 4 are stacked in the direction in which the coiled cord 1 is extended and contracted. In the aforementioned coiled cord 1, as the cables 2 are stacked in a plurality of layers in a nesting structure as described above, the length of each of the cables 2 can be increased as compared to the cables of the coiled cord disclosed in Japanese Unexamined Patent Application Publication No. 2001-351442 while preventing a winding diameter of the coiled cord 1 in a plane orthogonal to the direction in which the coiled cord 1 is extended and contracted in a natural state from increasing.

It should be noted that in a common coiled cord, for example, a layer in which a cable is wound from the inner side of the coiled cord to the outer side thereof in the radial direction is continuously formed in the direction in which the coiled cord is extended and contracted. Accordingly, in order to form the ends of the cables of the respective layers on the outer side of the coiled cord in the radial direction continuously with the ends of the cables of the adjacent layers on the inner side of the coiled cord in the radial direction, it is necessary to dispose a pull-back part of the cable between the layers.

On the other hand, in the coiled cord 1 according to this embodiment, the positions in which the cable 2 of the first layer 3 is continuously connected to the cable 2 of the second layer 4 are alternately located in the direction in which the coiled cord 1 is extended and contracted. That is, when the position in which the cable 2 of the predetermined first layer 3 is continuously connected to the cable 2 of the second layer 4 is located outside the coiled cord 1, the position in which the cable 2 of the adjacent first layer 3 is continuously connected to the cable 2 of the second layer 4 is located inside the coiled cord 1. This structure eliminates the need to dispose a pull-back part of the cable like a common coiled cord between the layers.

Thus, it is possible to increase the length of the cable 2 while preventing the height of the coiled cord 1 in the direction in which the coiled cord 1 is extended and contracted from increasing and reduce the housing space inside the extending and contracting mechanism 13 housing the coiled cord 1. It should be noted that in a case where a plurality of cables 2 are stacked and integrated in the direction in which the coiled cord 1 is extended and contracted as described above, the cables tend to bundle together to maintain the posture of the coiled cord 1 in the direction in which the coiled cord 1 is extended and contracted, and thus it is possible to prevent the posture of the coiled cord 1 in a natural state from collapsing.

Figure 5:
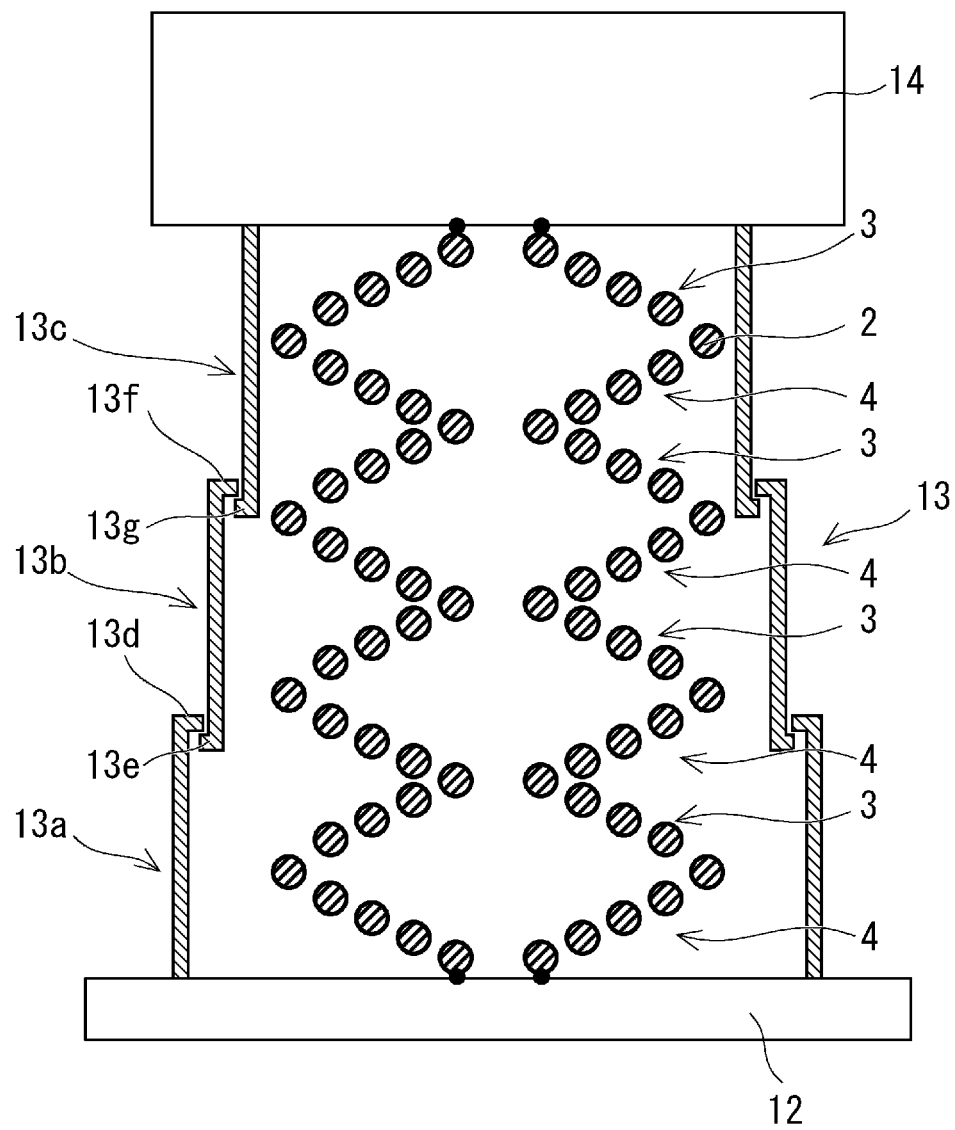
FIG. 5 is a diagram showing a state in which the displacement apparatus to which the coiled code according to the first embodiment is applied is extended.

Next, a description is given of a state in which the displacement apparatus to which the coiled code 1 according to this embodiment is applied is extended. FIG. 5 is a diagram showing a state in which the displacement apparatus to which the coiled code according to this embodiment is applied is extended. Note that a part of FIG. 5 is an end view. As shown in FIG. 5, when the actuator of the extending and contracting mechanism 13 operates, the second cylindrical rod 13b protrudes from the first cylindrical rod 13a, the third cylindrical rod 13c protrudes from the second cylindrical rod 13b, and the extending and contracting mechanism 13 extends, whereby the coiled cord 1 extends in accordance with the displacement of the part 14 to be displaced.

At this time, in the coiled cord 1, as the positions in which the cable 2 of the first layer 3 is continuously connected to the cable 2 of the second layer 4 are alternately located in the direction in which the coiled cord 1 is extended and contracted, it is possible to smoothly extend the coiled cord 1 in the direction in which the extending and contracting mechanism 13 is extended.

Further, in a state in which the extending and contracting mechanism 13 is extended, the protruding part 13d of the first cylindrical rod 13a comes into contact with the first protruding part 13e of the second cylindrical rod 13b, whereby the second cylindrical rod 13b can be prevented from coming off the first cylindrical rod 13a. Similarly, the second protruding part 13f of the second cylindrical rod 13b comes into contact with the protruding part 13g of the third cylindrical rod 13c, whereby the third cylindrical rod 13c can be prevented from coming off the second cylindrical rod 13b.

When the actuator of the extending and contracting mechanism 13 operates in a state in which the displacement apparatus 11 is extended as described above and the displacement apparatus 11 is contracted so that the first cylindrical rod 13a, the second cylindrical rod 13b, and the third cylindrical rod 13c substantially overlap each other as shown in FIG. 4, the coiled cord 1 is contracted in accordance with the displacement of the part 14 to be displaced.

At this time, in the coiled cord 1, as the positions in which the cable 2 of the first layer 3 is continuously connected to the cable 2 of the second layer 4 are alternately located in the direction in which the coiled cord 1 is extended and contracted, it is possible to smoothly contract the coiled cord 1 in the direction in which the extending and contracting mechanism 13 is contracted.

As described above, in the coiled cord 1, as the cables 2 are stacked in a plurality of layers in a nesting structure, the length of each of the cables 2 can be increased as compared to the cables of the coiled cord disclosed in Japanese Unexamined Patent Application Publication No. 2001-351442 while preventing a winding diameter of the coiled cord 1 in a plane orthogonal to the direction in which the coiled cord 1 is extended and contracted in a natural state from increasing. Further, in the coiled cord 1, the positions in which the cable 2 of the first layer 3 is continuously connected to the cable 2 of the second layer 4 are alternately located in the direction in which the coiled cord 1 is extended and contracted, and it is not necessary to dispose a pull-back part of a cable like a common coiled cord between the layers, whereby it is possible to increase the length of the cable 2 while preventing the height of the coiled cord 1 in the direction in which the coiled cord 1 is extended and contracted from increasing and reduce the housing space inside the extending and contracting mechanism 13 housing the coiled cord 1.

Thus, the displacement apparatus 11 to which the coiled cord 1 is applied can increase the length of the cable 2 while preventing the winding diameter of the coiled cord 1 in a plane orthogonal to the direction in which the coiled cord 1 is extended and contracted and the height of the coiled cord in the direction in which the coiled cord 1 is extended and contracted from increasing, whereby a large amount of a displacement can be secured while reducing the housing space for the coiled cord 1.

Figure 6:
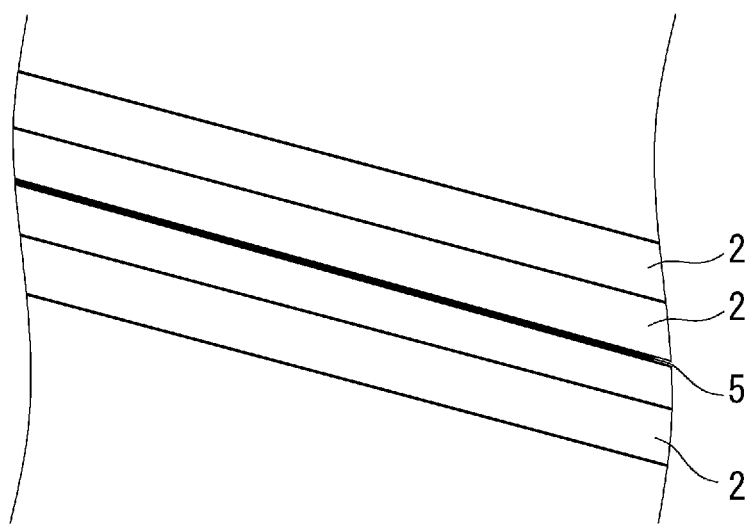
FIG. 6 is an enlarged view of a part of the coiled cord including an elastic member.

As shown in FIG. 6, the coiled cord 1 may include an elastic member 5 that exhibits a restoring force when the extended coiled cord 1 is contracted to a natural state. The elastic member 5 is, for example, an elastically deformable resin or metal wire rod formed in a shape corresponding to the cable 2 of the coiled cord 1 in a natural state and may be provided on the surface or inside of the cable 2. Thus, the extended coiled cord 1 can be smoothly restored to a natural state.

Second Embodiment

Figure 7:
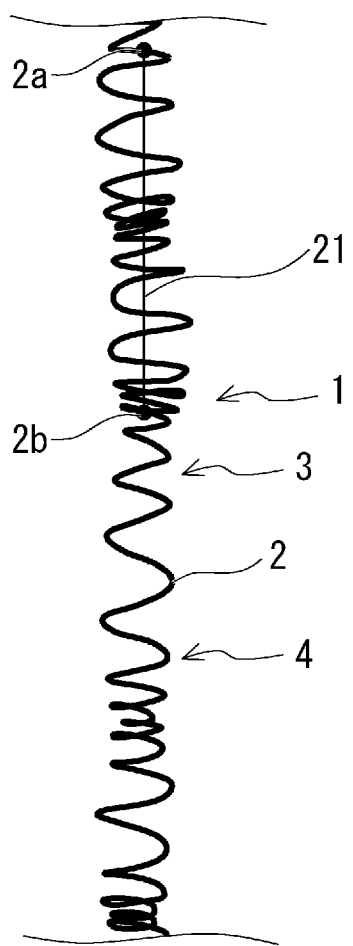
FIG. 7 is an enlarged perspective view of a part of the coiled cord provided with a restricting member.

For example, when the displacement direction of the displacement apparatus 11 is the vertical direction, the upper part of the coiled cord 1 is intensively extended and contracted, and the load on the upper part of the coiled cord 1 is large. Therefore, for example, as shown in FIG. 7, a first part 2a of the cable 2 in a predetermined layer at the upper part of the coiled cord 1, which is located on the inner side of the coiled cord 1 in the radial direction, and a second part 2b of the cable 2 in a layer different from the predetermined layer, which is located on the inner side of the coiled cord 1 in the radial direction, may be connected to each other by a restricting member 21. That is, the displacement apparatus 11 may include the restricting member 21.

The restricting member 21 is, for example, a member that is deformable and is hard to be extended and contracted such as a string or a chain, and one end of the restricting member 21 may be connected to the first part 2a of the cable 2 by connection means such as an adhesive and the other end of the restricting member 21 is connected to the second part 2b of the cable 2 by connection means such as an adhesive while the restricting member 21 is inserted into the coiled cord 1. By doing so, it is possible to reduce a local load on the cable 2 and prevent the coiled cord 1 from being damaged.

Figure 8:
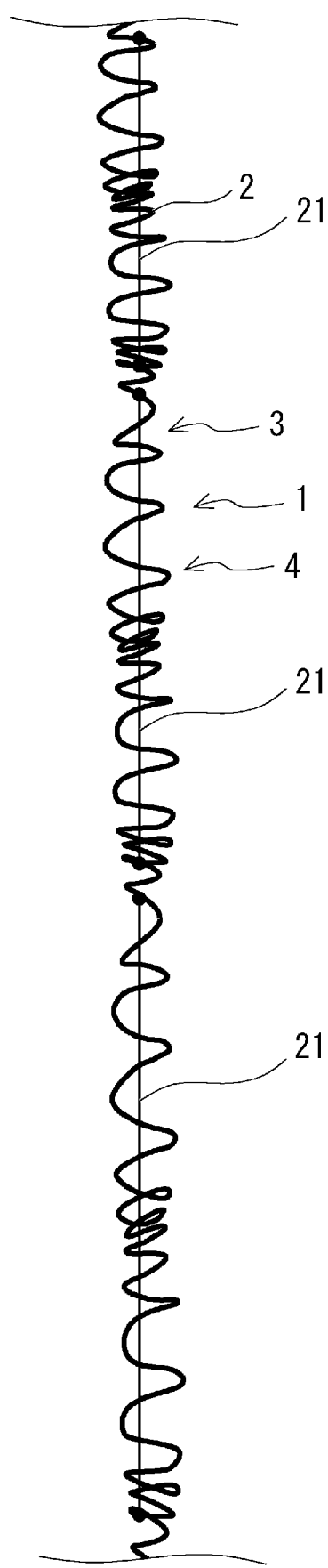
FIG. 8 is an enlarged perspective view of a part of the other coiled cord provided with the restricting member.

As shown in FIG. 8, the restricting members 21 may be provided at a plurality of places in the coiled cord 1. In this case, the length of the restricting member 21 may be shorter as the restricting member 21 is located at a position where the frequency of an extension and a contraction of the coiled cord 1 is higher. For example, when the displacement direction of the displacement apparatus 11 is the vertical direction, the length of the restricting member 21 may be shorter as the restricting member 21 is located on the upper side of the coiled cord 1. By this structure, it is possible to distribute a load on the coiled cord 1. As a result, it is possible to reduce a local load on the cable 2 and prevent the coiled cord 1 from being damaged.

Note that the restricting member 21 may be provided at any position in the coiled cord 1, and may be provided at a position where the frequency of an extension and a contraction due to a displacement of the displacement apparatus 11 is high. Further, the restricting member 21 is not limited to adhesion means such as an adhesive and may be fixed to the cable 2 by fixing means such as a jig. In short, means for connecting the restricting member 21 to the cable 2 is not limited.

The present disclosure is not limited to the above-described embodiments and can be modified as appropriate without departing from the spirit of the present disclosure.

For example, although the displacement apparatus 11 according to the aforementioned embodiments is configured to be extended and contracted in the one axial direction, it is possible to use the coiled cord 1 if the displacement apparatus 11 is configured to be bent and extended like an arm joint of a robot. Further, the displacement apparatus 11 is not limited to being used as a part of a robot but may be used as a part of a production machine or the like.

For example, although the coiled cord 1 according to the aforementioned embodiments includes a plurality of first and second layers 3 and 4 alternatively stacked thereon, it may include at least the first layer 3 and the second layer 4. Further, the above-described first and second layers 3 and 4 may be located in a part of the coiled cord.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A displacement apparatus comprising:
    a coiled cord comprising a wound cable, the cable being capable of being freely extended and contracted in an axial direction, the coiled cord comprising:

a first substantially planar layer in which the cable is spirally wound about the axial direction from a radially inner side of the coiled cord to a radially outer side thereof, and a second substantially planar layer in which the cable is spirally wound about the axial direction from the radially outer side of the coiled cord to the radially inner side thereof, the first and the second layers being continuously connected to each other;

a base part;

a part to be displaced configured to be displaced with respect to the base part, the coiled cord being extended and contracted in accordance with displacement of the part to be displaced; and an extending and contracting mechanism comprising at least a first rod and a second rod inserted in the first rod, one end of the mechanism being fixed to the base part and another end of the mechanism being fixed to the part to be displaced, wherein:

the coiled cord is located within the extending and contracting mechanism;

the second rod is substantially housed inside the first rod when the extending and contracting mechanism is contracted; and the second rod protrudes from the first rod when the extending and contracting mechanism is extended.

2. The displacement apparatus according to claim 1, wherein when a direction in which the coiled cord is extended and contracted is the axial direction, a plurality of the cables are stacked and integrated in the direction in which the coiled cord is extended and contracted.

3. The displacement apparatus according to claim 1, wherein a direction in which the cable of the first layer is wound from the radially inner side of the coiled cord to the radially outer side thereof is the same as a direction in which the cable of the second layer is wound from the radially outer side of the coiled cord to the radially inner side thereof.

4. The displacement apparatus according to claim 1, wherein a direction in which the cable of the first layer is wound from the radially inner side of the coiled cord to the radially outer side thereof is different from a direction in which the cable of the second layer is wound from the radially outer side of the coiled cord to the radially inner side thereof.

* * * * *